US006287101B1

(12) United States Patent
Jasani et al.

(10) Patent No.: US 6,287,101 B1
(45) Date of Patent: Sep. 11, 2001

(54) SEMI-PNEUMATIC MINE SERVICE TIRE

(75) Inventors: Shirish Rasikchandra Jasani; Jerry Malin, both of Akron; William Earl Rayman, Hartville; Richard Henry Reisinger, Canton, all of OH (US)

(73) Assignee: The Goodyear & Tire Company, Akron, OH (US)

( * ) Notice: Subject to any disclaimer, the term of this patent is extended or adjusted under 35 U.S.C. 154(b) by 0 days.

(21) Appl. No.: 09/572,014

(22) Filed: May 16, 2000

Related U.S. Application Data

(62) Division of application No. 09/180,594, filed on Nov. 23, 1998, now Pat. No. 6,105,641.

(51) Int. Cl.$^7$ .................................................. B29D 30/04
(52) U.S. Cl. ................................................................ 425/49
(58) Field of Search ........................................ 425/49, 54

(56) References Cited

U.S. PATENT DOCUMENTS

| | | |
|---|---|---|
| 1,218,431 | 3/1917 | McCrimmon . |
| 1,389,438 * | 8/1921 | De Mattia ............................... 425/54 |
| 1,428,726 | 9/1922 | Warth . |
| 1,455,038 | 5/1923 | Bledsoe . |
| 1,477,425 | 12/1923 | Cataldo . |
| 1,670,446 * | 5/1928 | Gammeter ............................... 425/54 |
| 1,704,538 * | 3/1929 | Hatfield ................................... 425/49 |
| 2,009,353 | 7/1935 | Budd . |
| 3,022,810 | 2/1962 | Lambe ................................... 152/157 |
| 3,794,706 | 2/1974 | Christie et al. ......................... 264/45 |
| 3,866,651 | 2/1975 | Gomberg ............................... 152/313 |
| 3,993,114 | 11/1976 | Hinderks ............................... 152/340 |
| 4,013,111 | 3/1977 | Powell ................................... 152/347 |
| 4,049,767 | 9/1977 | Vaidya ................................... 264/257 |
| 4,063,861 * | 12/1977 | Schmidt et al. ......................... 425/54 |
| 4,071,386 | 1/1978 | Gomberg ............................... 156/113 |
| 4,197,068 * | 4/1980 | Pizzorno ............................... 425/49 |
| 4,197,893 | 4/1980 | O'Coin ................................... 152/310 |
| 4,279,856 * | 7/1981 | Vente et al. ............................. 425/54 |
| 4,722,377 | 2/1988 | Dobson ................................... 152/158 |
| 4,751,951 | 6/1988 | Dobson ................................... 152/520 |
| 4,895,692 * | 1/1990 | Laurent et al. ......................... 425/49 |
| 5,031,679 | 7/1991 | Shoner ................................... 152/157 |

FOREIGN PATENT DOCUMENTS

| | | |
|---|---|---|
| 3711785 | 10/1988 | (DE) . |
| 352045 | 1/1990 | (EP) . |
| 1283182 | 12/1961 | (FR) . |
| 2354192 | 1/1978 | (FR) . |
| 2024118 | 1/1980 | (GB) . |

OTHER PUBLICATIONS

Brochure entitled, "Tires for Underground Mine Service," Undated.
International Search Report, PCT/US97/01768.

* cited by examiner

Primary Examiner—James P. Mackey
(74) Attorney, Agent, or Firm—The Goodyear Tire & Rubber Company; Roger D. Emerson; John M. Skeriotis

(57) ABSTRACT

A semi-pneumatic tire assembly including a tire casing 22 and a lining 26 is provided. The lining 26 includes a contoured inward surface 30 defining an inflation chamber 18 about an associated wheel rim. The lining 26 minimizes the risk of puncture damage from an object penetrating the tire casing 22 while allowing pneumatic cushioning of the ride and cooler running temperatures as compared to solid-fill tires. Additionally, the semi-pneumatic tire will carry the same load or more than the same tire filled with permafoam and/or solid urethane foam wingfil. The tire assembly is formed by injecting a curable, lining-forming material 96 into a cavity 57 defined between the tire casing 22 and a molding member 50. The molding member 50 includes a contoured outer surface 54 which molds the inward surface of the lining 26. The molding member 50 may be an inflatable airbag 100 retained in the tire assembly during service. Alternately, the molding member 50 may be a solid core 114 which is removed prior to mounting the tire casing 22 and lining 26 on the associated rim.

1 Claim, 4 Drawing Sheets

US 6,287,101 B1

SEMI-PNEUMATIC MINE SERVICE TIRE

This application is a division of application Ser. No. 09/180,594 filed Nov. 23, 1998, which is now issued as U.S. Pat. No. 6,105,641.

TECHNICAL FIELD

This invention pertains to methods and apparatuses for forming semi-pneumatic tires, and more specifically to methods and apparatuses for forming semi-pneumatic tires having a lining member that includes a contoured inward surface to provide a pneumatic cavity of predetermined dimensions between the lining member and an associated wheel rim.

BACKGROUND ART

Tires for use in off-road applications, such as mine service tires, are subjected to conditions which require the tires to withstand punctures, especially in the tread regions. Solid-fill tires have been used in such applications. However, disadvantages of solid-fill tires include the facts that they generally run hotter than pneumatic tires and do not provide the cushioned ride of pneumatic tires.

Alternatives to solid-fill tires have been proposed in the art. For example, U.S. Pat. No. 3,022,810 to Lambe discloses a tire and rim combination wherein the cavity between an inner surface of the tire and the rim may be partially filled with a resilient foam. Generally, the resilient foam is said to adhere to the wheel rim to form an air-tight seal. The foam may allegedly be prevented from adhering to the wheel rim at certain points to allow the introduction of compressed air through the wheel rim. The foam is compressed in the presence of introduced air or expanded to fill the cavity in the absence of air.

U.S. Pat. No. 4,197,893 to O'Coin discloses a reusable shield for use within a tire casing. The outer surface of the shield mates with the inside surface of the casing and the inner surface of the shield is contoured to minimize the thickness at a flex point of the tire in order to purportedly reduce heat build-up and fatigue. A base ring fills the space between the wheel rim and the shield. Alternately, a pneumatic tube can be used in place of the ring. The outer surface of the shield does not adhere to the inside surface of the casing in order to allow removal and reuse of the shield. The shield is molded by fitting the base ring between a casing and a wheel by cutting a slit in the ring. The ring is also equipped with pull tabs to assist removal. An opening passage is formed through either the ring or the casing. Liquid urethane is then injected between the ring and the casing under pressure and allowed to harden.

There still exists a need in the art for a tire and method of producing such for use in off-road applications which provides puncture-resistance, especially in the tread region, which provides better performance than solid-fill tires.

DISCLOSURE OF THE INVENTION

The inventive semi-pneumatic tire 10 includes a tire assembly 12 for mounting on an associated rim 14. The tire assembly 12 includes a tire casing 22 and a lining 26. Tire casing 22 encloses a predetermined volume between an inner surface 38 thereof and the associated rim 14. The lining 26 occupies a portion of the enclosed volume with the remainder of the enclosed volume being an inflation chamber 18.

The lining 26 comprises a radially inward surface 30 and a radially outward surface 32. The radially outward surface 32 conforms to the shape of the inner surface 38 of a tire casing 22. The inward surface 30 of the lining 26 cooperates with associated wheel rim 14 to define boundaries for inflation chamber 18.

The inventive method can be summarized by the following steps:

positioning a molding member 50 relative to a tire casing 22, the tire casing including a pair of spaced beads 120,122;

mounting the tire casing 22 and the molding member 50 on an associated rim-like member 56;

seating the beads 120,122 on bead-receiving areas of the rim-like member by introducing air through a rim valve 106;

introducing flowable, curable fill material 96 into a cavity 57 between the outer surface 54 of the molding member 50 and an inner surface 38 of the tire casing through the rim valve 106;

curing the material so that the material solidifies to fill the cavity and forms an inward surface 30; and leaving the molding member inside the wheel tire assembly for the introduction of variable air pressure to control ride characteristics.

The molding member 50 is substantially ring-shaped having a first contoured surface 54. The first contoured surface 54 of the molding member 50 includes a tread-underlying portion, shoulder-underlying portions, and bead-underlying portions. The shape of the molding member 50 determines the contour of inward surface 30 of lining 26 and also the shape of the inflation chamber 18. The tread-underlying portion 58 of first surface 54 is generally parallel to the tread region 42 as indicated by the straight line between points 62,64. The shoulder-underlying portions 68 of the first surface 54 are convex in cross-section and symmetric about the circumferential centerline 76. The mating lining inward surface 30 therefore is concave in cross-section near the shoulder regions 78 of the tire casing 22. Points 82,84 indicate flex points on the first surface 54. The bead-underlying portions 90 of the first surface 54 are concave in cross-section and also symmetric about the circumferential centerline 76.

After curing, the tire assembly 12 is ready for in-service operation. In a preferred embodiment, the molding member 50 remains in the tire assembly 12 to produce an enclosed inflation chamber 18.

DETAILED DESCRIPTION OF THE INVENTION

Figure 1:
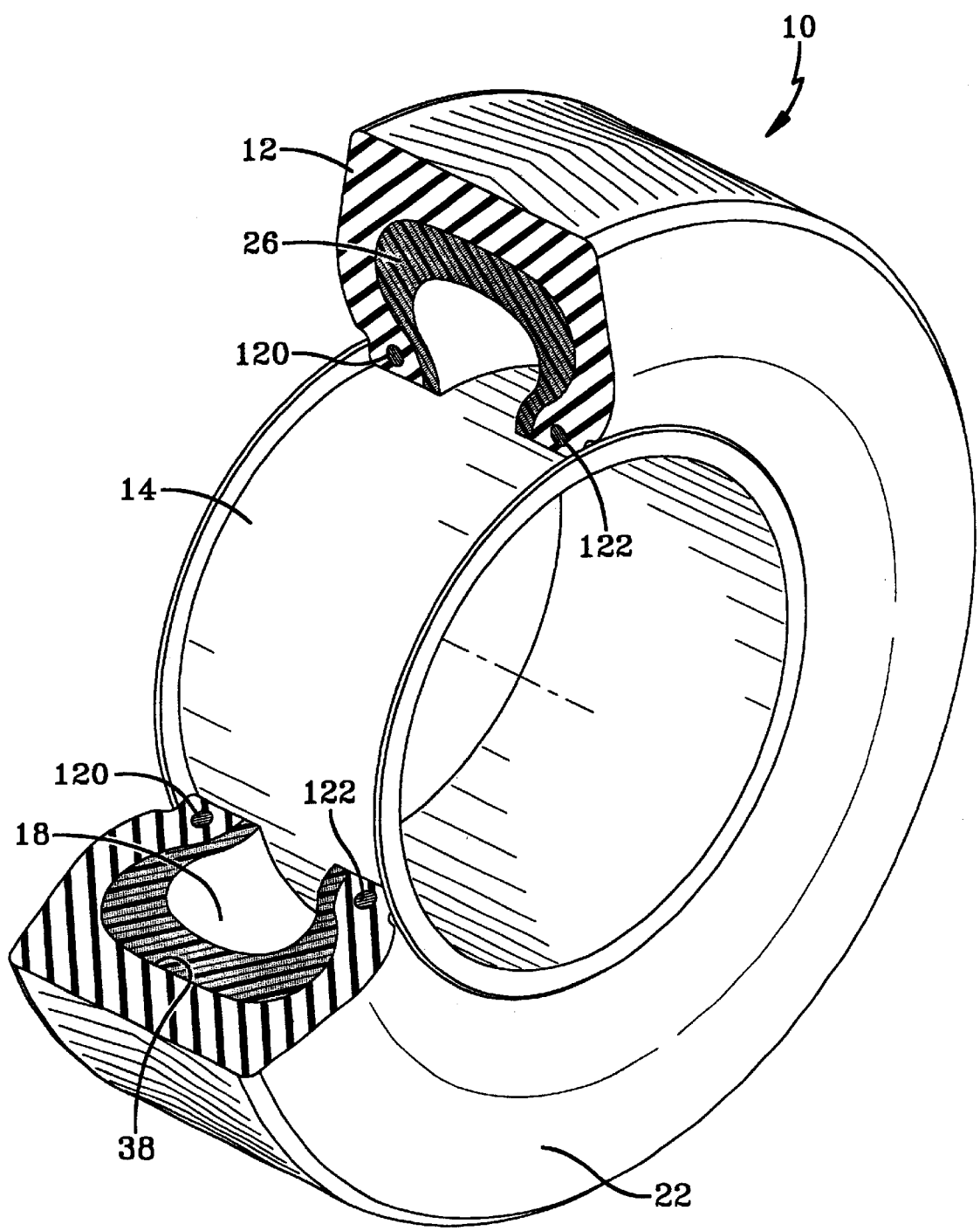
FIG. 1 is a partially cut away perspective view of a semi-pneumatic tire and an associated rim.

Referring now to the drawings wherein the showings are for purposes of illustrating a preferred embodiment of the invention only and not for purposes of limiting the same, FIG. 1 shows a semi-pneumatic tire 10 according to the present invention. The semi-pneumatic tire 10 includes a tire assembly 12 mounted on an associated wheel rim 14. The tire assembly 12 cooperates with the associated rim 14 to form an inflation chamber 18 for containing inflation fluid, such as air. The tire assembly 12 includes a tire casing 22, beads 120,122 and a lining 26. Tire casing 22 encloses a predetermined volume between an inner surface 38 and the associated rim 14. The lining 26 occupies a portion of the enclosed volume with the remainder of the enclosed volume being the inflation chamber 18.

Figure 2:
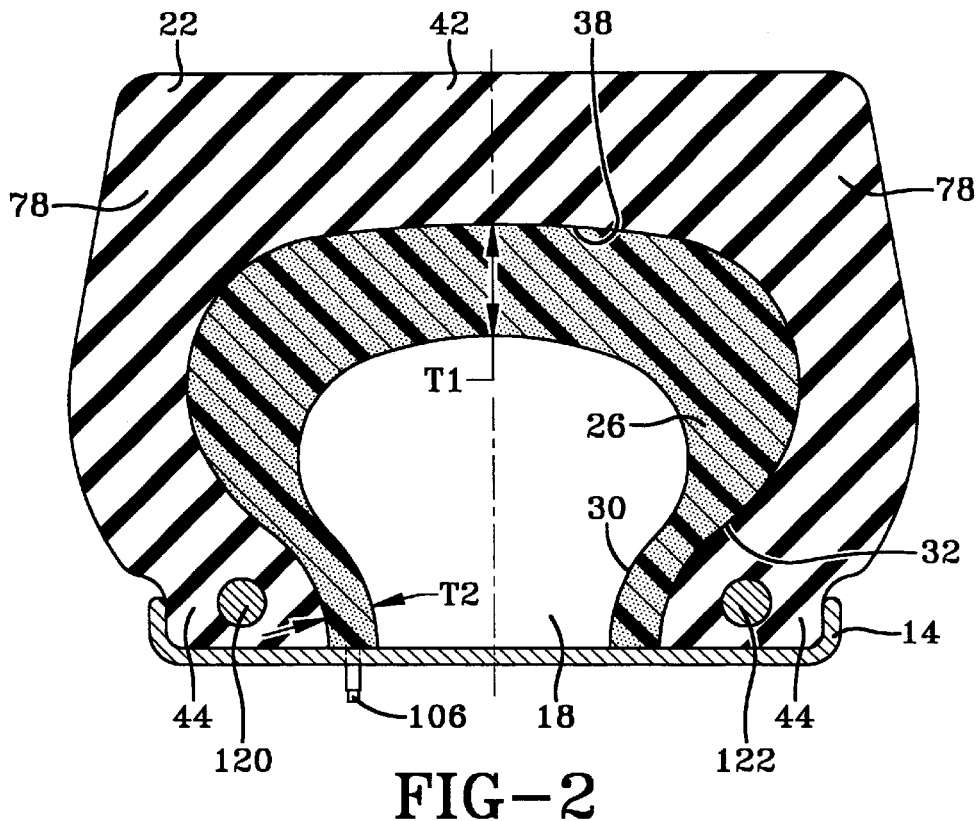
FIG. 2 is a cross-sectional, end view of a portion of a semi-pneumatic tire according to the invention.

With reference to FIG. 2, the lining 26 comprises an inward surface 30 and an outward surface 32. In a preferred embodiment, the lining 26 comprises soft urethane or other rubber-like material. The contour of the lining 26 is an important aspect of the present invention. The radially outward surface 32 conforms to the shape of the inner surface 38 of a tire casing 22. In one embodiment, the outward surface 32 of the lining 26 is adhered to the inner surface of tire casing 22. As shown in FIG. 2, the inward surface 30 comprises a different contour than outward surface 32. Therefore, the thickness of the lining 26 is not consistent throughout but includes a first thickness $T_1$ near the tread region 42 of the tire casing 22 and a second thickness $T_2$ near the bead region 44 of the tire casing 22. The thickness of the lining 26 is varied to match the need for puncture protection. In a preferred embodiment the first thickness $T_1$ is greater than a second thickness $T_2$. In one preferred embodiment $T_1$ is a maximum thickness of the lining 26.

The preferred methods for producing a semi-pneumatic tire 10 according to the invention will now be described with reference to FIGS. 1–6. According to one preferred method, and with particular reference to FIG. 3, an annular molding member 50 is mounted about the rim band 104 of rim-like member 56. The molding member 50 includes a first contoured surface 54. As is evident from FIG. 3, a first annular cavity 57 is defined between the inner surface 38 of the tire casing 22 and first surface 54 of the molding member 50 when the bead regions 44 of casing 22 are seated on rim-like member 56 by introduction of air through rim valve 106. The first cavity 57 will be occupied by the lining 26 as shown in FIG. 2 and described later in this specification.

Figure 6:
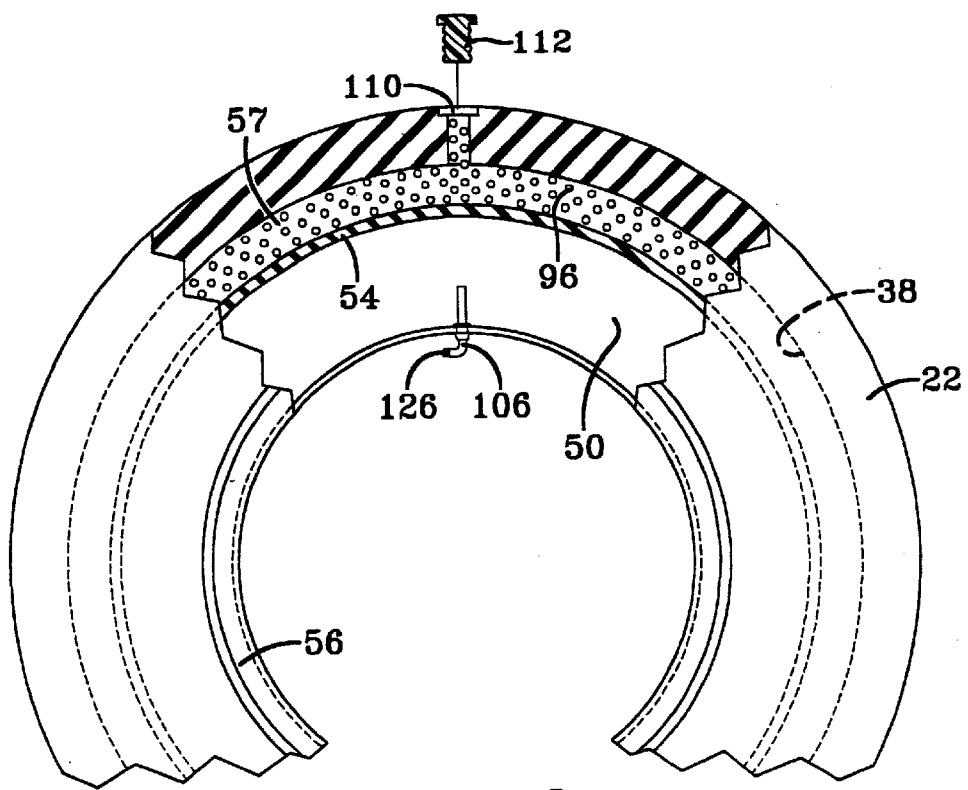
FIG. 6 is a cross-sectional, side view of a tire casing according to the invention.

With particular reference to FIG. 6, a vent hole 110 is drilled through the tire casing 22 at the centerline of the tire casing 22 at a position aligned with the location of the rim valve 106. Preferably, the vent hole 110 has a diameter of at least 0.25 inches (0.635 cm). The tire casing 22 is then vertically positioned, tread surface down, so that the exposed end 126 of the rim valve 106 projects directly downward and a centerline of the vent hole 110 is perpendicular and 90° to the floor. A flowable, curable fill material 96 is introduced into first cavity 57 to form lining 26 through the rim valve 106 until it begins to flow out through the vent hole 110. A plug or screw 112 is then inserted into the vent hole 110 and pressure of the flowable material 96 is increased to approximately 9 pounds per square inch. The filled assembly is then laid horizontally while the material cures. Preferably, the curable material 96 cures in approximately 24 hours at room temperature. It is believed that acceptable cures can be had with cures between 12 hours and 36 hours.

Figure 3:
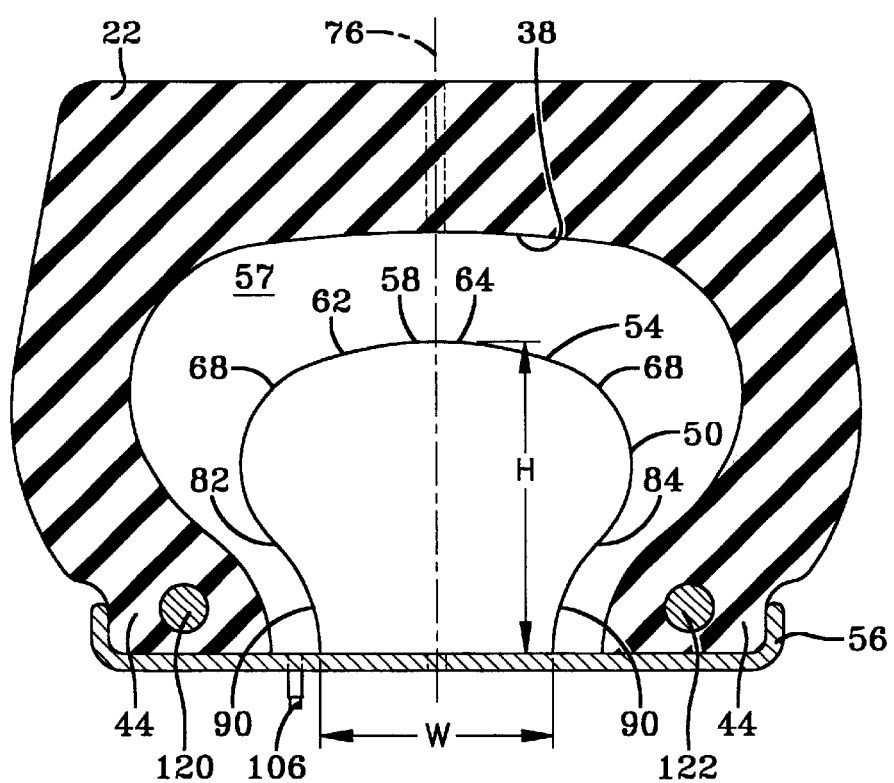
FIG. 3 is a cross-sectional, end view, partly in section, showing the contour of a molding member according to the invention.

The contour of the first surface 54 of the molding member 50, and the inward surface 30 of the lining 26 will now be described in detail with reference to FIGS. 2 and 3. The tread-underlying portion 58 of first surface 54 is generally parallel to the tread region 42 as indicated by the straight line between points 62,64. The cross-sectional height H of the molding member 50 cooperates with inner surface 38 to determine the eventual thickness $T_1$, of the lining 26 near the tread region 42 of the tire casing 22. In a preferred embodiment, the molding member 50 has a height H which yields a thickness $T_1$, of at least 2.0 inches (5.1 cm). The shoulder-underlying portions 68 of the first surface 54 are convex in cross-section and symmetric about a circumferential centerline 76. The mating lining inward surface 30 therefore is concave in cross-section near the shoulder regions 78 of the tire casing 22. Points 82,84 indicate flex points on the first surface 54. The bead-underlying portions 90 of the first surface 54 are concave in cross-section and also symmetric about the circumferential centerline 76. Flex points 82 84 allows the lining to flex with the tire casing 22 during operation. In this way, lining 26 operates as an integral part of the tire. As is readily apparent, the inward surface 30 of the lining 26 is therefore convex near the bead regions 44 of the tire casing 22. The cross-sectional width W of the molding member 50 near the rim-like member 56 cooperates with inner surface 38 to determine the eventual thickness T, of the lining 26 near the bead regions 44 of the tire casing 22. In a preferred embodiment $T_2$ is between 0.5 inches and 0.8 inches. The thickness T, is at least 2.5 $T_2$.

As the material 96 cures, first cavity 57 is filled and lining 26 is formed. Lining 26 therefore has an inward surface 30 which mates with the first surface 54 of the molding member 50. The lining 26 also has an outward surface 32 which mates with the inner surface 38 of tire casing 22. In one embodiment, the lining 26 adheres to the inner surface 38 of the tire casing 22. The adherence of the lining 26 with inner surface 38 may be accomplished by a curing reaction of the material 96 with tire casing 22. Alternately, an adhesive may be applied to the inner surface 38 of the tire casing 22 before introduction of material 96. The lining 26 and the tire casing 22 together form a tire assembly 12. The adhesive can be chosen with sound engineering judgement.

Figure 4:
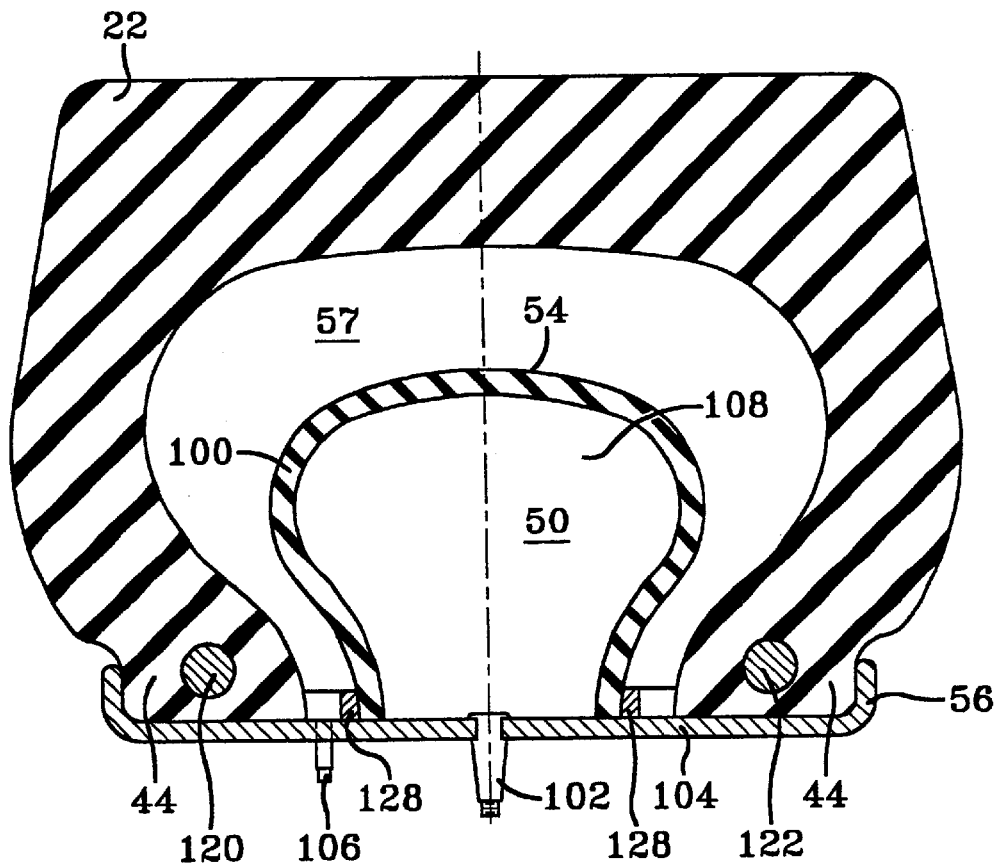
FIG. 4 is a cross-sectional, end view of one embodiment of a molding member.

With reference to FIG. 4, in one embodiment, the molding member 50 comprises a generally hollow ring-shaped, toroidal airbag 100, having an airbag valve 102. Rim-like member 56 is adapted to receive airbag valve 102. Airbag 100 is inserted into the tire casing 22. The tire casing 22 and airbag 100 are then mounted about rim-like member 56. The airbag 100 is designed to have a stretch fit over the rim band 104. The bead regions 44 of the tire casing 22 are seated on rim-like member 56 by introducing air through a rim valve 106 by methods common and known in the art.

Figure 4A:
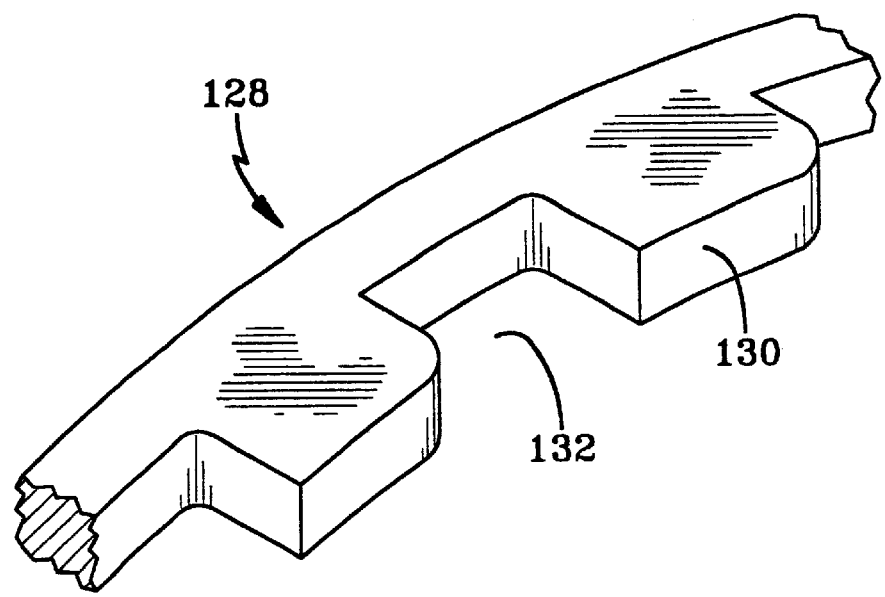
FIG. 4A is a partial perspective view of a spacer according an embodiment of the invention.

In a preferred embodiment, annular spacers 128 which are positioned adjacent rim-like member 56 may be used to separate the first surface 54 of the, molding member 50 from the bead regions 44. The preferred configuration of the spacers 128 includes alternating protrusions, such as stand-off buttons 130, as shown in FIG. 4A. The stand-off buttons 130 provide the spacing effect needed while the gaps 132 between the buttons 130 allow flexibility of the spacer 128 and reduce the volume occupied by a comparable solid spacer.

Air is introduced into the interior 108 of the airbag 100 through airbag valve 102 until the first contoured surface 54 assumes the molding configuration as described above with reference to FIG. 3.

In this preferred method, the molding member 50, in this case airbag 100, is retained in the tire assembly 12 during service. Therefore, rim-like member 56 is actually the service rim 14 for the tire 10.

Figure 5:
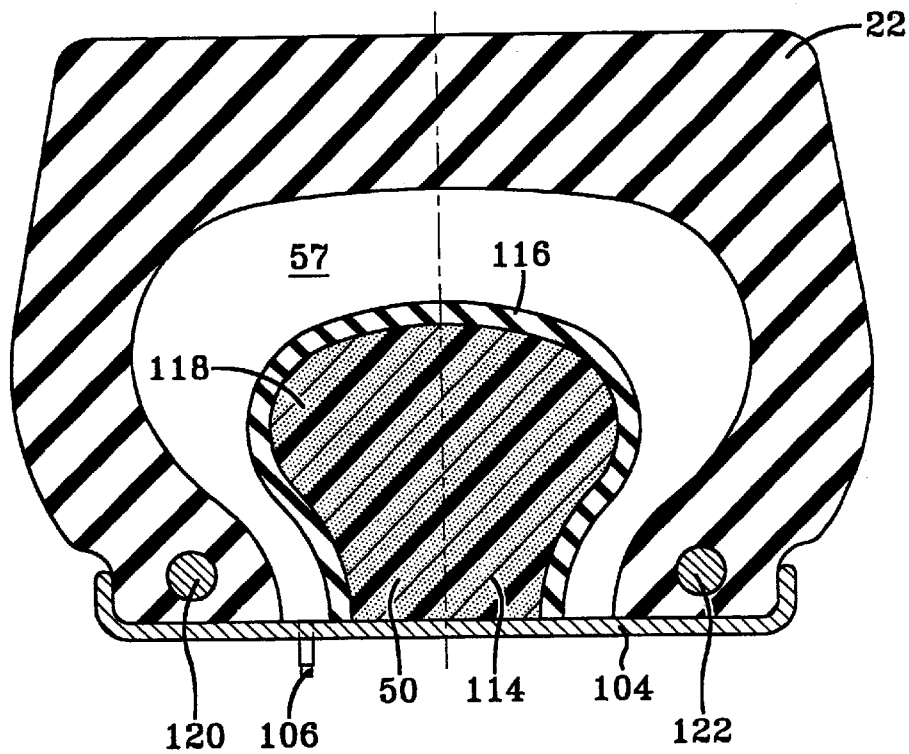
FIG. 5 is a cross-sectional, end view of another embodiment of a molding member.

With reference to FIG. 5, in another preferred method, a flexible solid core 114 is used as molding member 50 rather than airbag 100. Solid core 114 preferably comprises a rubber-like polymer outer shell 116 with a foam rubber interior 118. The solid core 114 is positioned in tire casing 22. Tire casing 22 is then mounted onto rima-like member 56. The solid core 114 is designed to have a stretch fit over the rim band 104. The method of producing a semi-pneumatic tire 10 proceeds as described above, including the steps of seating the bead regions 44, drilling the vent hole 110, and introducing and curing the curable material 96.

After lining 26 is formed, the tire assembly 12 is dismounted from rim-like member 56 and the solid core 114 is removed. A heavy duty tube with or without a flap (not shown) is then inserted into the tire assembly before the tire is mounted onto service rim 14. The tube is then inflated to provide a pneumatic feel to the ride.

For the embodiment which utilizes solid core 114 for molding member 50, prior to the introduction of material 96, the first surface 54 of the molding member 50 is treated with a mold release to facilitate removal from the tire assembly 12 after curing. The mold release can be of any type known in the art and chosen with sound engineering judgement. After curing, the tire assembly 12 is dismounted from the rim-like member 56 and molding member 50. For use in operation, as shown in FIG. 1, the tire assembly 12 is mounted onto an associated rim 14. The inward surface 30 of the lining 26 cooperates with the rim 14 to form inflation chamber 18. It is apparent then that the void due to the absence of the molding member 50 becomes the inflation chamber 18 of the semi-pneumatic tire 10 according to the invention.

In the embodiment which utilizes airbag 100 as molding member 50, the airbag 100 defines inflation chamber 18.

The molding member 50 preferably comprises rubber when airbag 100 is employed.

When solid core 114 is utilized, molding core 50 preferably comprises a composite of rubber-like polymer around a foam rubber interior.

The curable fill material 96 may be any type of solidifiable, liquid material which fills the first cavity 57 upon curing. Preferred materials include a product available from the Goodyear Tire and Rubber Company and sold under the trade name "Wingfil™".

In a preferred embodiment, the lining 26 comprises approximately sixty percent (60%) of the volume enclosed by casing 22. It is believed the lining should be between forty percent and eighty percent.

In a preferred embodiment, the tire 10 is inflated with air at a pressure up to 150 pounds per square inch. It is believed that the lining 26 compresses slightly in response to the introduction of air.

The semi-pneumatic tire 10 of the present invention may be advantageously used as a mine service tire or in other heavy-use off-road applications.

The preferred embodiments have been described, hereinabove. It will be apparent to those skilled in the art that the above methods may incorporate changes and modifications without departing from the general scope of this invention. It is intended to include all such modifications and alterations in so far as they come within the scope of the appended claims or the equivalents thereof.

What is claimed is:

1. An annular molding member for molding an interior surface of a lining for a semi-pneumatic tire, the molding member characterized by:

a solid core member having a first contoured surface, the first contoured surface including a tread-underlying portion, first and second shoulder-underlying portions, and first and second bead-underlying portions, the tread-underlying portion being generally linear in cross-section, the shoulder underlying portion being located on either side of the tread-underlying portion and being convex in cross-section, and the bead-underlying portions being adjacent the shoulder underlying portions and being concave in cross-section, said solid core member having an outer shell comprising a first material and an interior comprising a second material, said interior having a substantially similarly shaped perimeter as said outer shell.

* * * * *